United States Patent [19]

Imada et al.

[11] 4,069,316
[45] Jan. 17, 1978

[54] METHOD FOR PRODUCING ANTIBIOTIC T-42082 AND ANTIBIOTIC T-42082

[75] Inventors: Akira Imada, Nishinomiya; Yukimasa Nozaki, Ikeda; Toru Hasegawa, Kawanishi; Masahiko Yoneda, Kobe, all of Japan

[73] Assignee: Takeda Chemical Industries, Ltd., Osaka, Japan

[21] Appl. No.: 737,317

[22] Filed: Nov. 1, 1976

[51] Int. Cl.$^2$ .............................................. A61K 35/00
[52] U.S. Cl. .................................. 424/122; 195/80 R; 424/121
[58] Field of Search ............. 195/80 R; 424/122, 121

[56] References Cited

U.S. PATENT DOCUMENTS

| 3,271,253 | 9/1966 | Price et al. ......................... 195/80 R |
| 3,595,955 | 7/1971 | DeBoer et al. ..................... 195/80 R |
| 3,711,605 | 1/1973 | Hamill et al. ......................... 424/122 |
| 3,812,249 | 5/1974 | Martin et al. ..................... 424/122 X |
| 3,839,558 | 10/1974 | Hamill et al. ..................... 424/122 X |
| 3,903,264 | 9/1975 | Oikawa et al. ......................... 424/122 |
| 3,929,992 | 12/1975 | Sehgal et al. ......................... 424/122 |
| 3,993,749 | 11/1976 | Sehgal et al. ......................... 424/122 |

Primary Examiner—Alvin E. Tanenholtz
Assistant Examiner—Robert J. Warden
Attorney, Agent, or Firm—Ladas, Parry, Von Gehr, Goldsmith & Deschamps

[57] ABSTRACT

This invention provides a method for producing Antibiotic T-42082 wherein the method comprises cultivating an Antibiotic T-42082-producing strain of the genus Streptomyces (ATCC 31080) to permit said strain to elaborate and accumulate Antibiotic T-42082 in the resultant broth and harvesting the antibiotic from said broth. This invention also includes the novel antibiotic.

3 Claims, 3 Drawing Figures

METHOD FOR PRODUCING ANTIBIOTIC T-42082 AND ANTIBIOTIC T-42082 fied, the observations were made after 2 weeks' incubation at 28° C.

Table 1

| Medium | Growth | Aerial mycelium | Reverse | Soluble pigment |
|---|---|---|---|---|
| Sucrose nitrate agar | Moderate, colorless - ivory | White - light gray | Cream - ivory | None |
| Glucose asparagine agar | Moderate, Grayish tan | White - grayish tan, with black | Grayish tan - brownish tan | Not produced, or light yellowish tan |
| Glycerin asparagine agar | Moderate, grayish tan - yellowish gray tan | Gray with olive tinge, with white specks | Light yellowish gray - light yellowish gray tan | Pale yellow |
| Starch agar | Moderate, light yellowish tan - grayish yellow tan | Grayish tan | Yellowish tan - grayish tan | Pale yellow |
| Nutrient agar | Moderate, colorless - Cream | White | Colorless - pale yellow | Not produced, or pale yellow |
| Tyrosine agar | Moderate, yellowish tan | Gray with yellow tinge - grayish tan, with black specks | Yellowish tan - dark gray | Yellowish tan |
| Yeast malt agar | Good, yellowish tan | White - Gray - grayish tan with yellow tinge | Dark brownish tan - dark yellowish tan | Orange yellow tan - yellowish tan |
| Oatmeal agar | Good, yellowish tan | White - gray with yellow tinge | Greenish yellow tan | Yellow |

(Note) All incubated at 28° C.

DETAILED DESCRIPTION OF THE INVENTION

The present invention relates to a novel Antibiotic T-42082 and a method for the production thereof.

In search of new antibiotics, microorganisms were isolated from a number of soil samples and separated and screened for their metabolites. As a result, it was found, for instance, that certain microorganisms produced a new antibiotic, that said microorganisms belonged to the genus Streptomyces and that by cultivating such a microorganism in an appropriate culture medium it was possible to cause said microorganism to accumulate in the broth said antibiotic which was found to be active against gram-positive bacteria, acid-fast bacteria and certain fungi, such as *Candida albicans* and *Piricularia oryzae*. The antibiotic was isolated and based on its physical chemical and biological characteristics, it was confirmed that said antibiotic was a new polyether-type antibiotic. The antibiotic was named Antibiotic T-42082.

In the method of the present invention there is employed an Antibiotic T-42082-producing strain of the genus Streptomyces. As an example thereof, there may be mentioned Strain T-42082 which was isolated from soil samples collected in a mountaineous area of Ito City, Shizuoka Prefecture, Japan in April, 1973. The following are some characteristics of the same strain.

a. Morphological characteristics

From a well-branched vegetative mycelium extends an aerial mycelium measuring about 1 ||, monopodially branched. At the ends of the side branches thus formed are chains of closed spiral spores. Th spore is elipsoidal to cylindrical (0.7–1.0 $\mu$ × 0.9–1.4 $\mu$), the spore configuration being verrucose (warty). No evidence of other special organs such as spherical sporangium, flagella, sclerotium, etc. are observed.

b. Cultural characteristics

The characteristics displayed by the strain on various media are set forth in Table 1. Unless otherwise specic. Physiological characteristics

| | |
|---|---|
| 10° C | − |
| 15 | + |
| 20 | ++ |
| 24 | +++ |
| 28 | +++ |
| 30 | +++ |
| 34 | +++ |
| 37 | +++ |
| 40 | ± |
| 45 | − |
| 50 | − |

− No growth
+ Growth
+++ Luxuriant growth
± Doubtful growth
++ Good growth

2. Liquefaction of gelatin: Positive
3. Hydrolysis of starch: Positive
4. Peptonization of skim milk: Positive Coagulation of skim milk: Negative
5. Production of melanoid pigment
Tyrosine-agar: Negative
Peptone-yeast extract-iron-agar: Negative
6. Assimilation of carbon sources (Pridham & Gottlieb agar) See Table 2.

Table 2

| | |
|---|---|
| i-Inositol | + |
| D-mannitol | + |
| D-xylose | + |
| L-arabinose | + |
| D-glucose | + |
| D-fructose | + |
| Rhamnose | + |
| Sucrose | + |
| Raffinose | + |
| Control (not added) | − |

− no growth
+ growth

The above characteristics indicate clearly that strain T-42082 belongs to the genus Streptomyces. Comparison of the above characteristics with the descriptions of many Streptomyces species in S.A. Waksman, The Actinomycetes, Vol. 2(1961), R. Hutter, Systematik der Streptomyceten (1967), International Streptomyces Project (ISP) and other literature shows that the present strain has much in common with *Streptomyces hygroscopicus* Waksman and Henrici (1948) so far as the characteristics important for the taxonomic identification of species are concerned. The inventors have relegated the strain to the species *Streptomyces hygroscopicus* and named it *Streptomyces hygroscopicus* T-42082.

*Streptomyces hygroscopicus* T-42082, which is exploited according to the present invention has been deposited at the Institute of Microbiological Technology of the Agency of Industrial Technology, the Institute for Fermentation, Osaka and American Type Culture Collection under the serial or accession number of FERM-P-2691, IFO-13609 and ATCC 31080, respectively.

The new strain was submitted to the American Type Culture Collection in 12301 Parklawn Drive, Rockville Maryland 20852 on August 6, 1976 and identified as *Streptomyces hygroscopicus* T-42082 and assigned the ATCC number 31080. The permanency of the deposit and the ready accesibility to the deposit by the public are afforded in the event the patent is granted. Access to the culture is available during the pendency of the application under Rule 14 and 35 U.S.C. 112. All restrictions on the availability of the culture deposited to the public will be irrevocably removed upon the granting of the patent.

Although the T-42082 strain has been described above, it is well known that characteristics of actinomycetes are not constant but are readily varied by spontaneous or artificial mutation and it should be understood that the strains of microorganisms employable according to the present invention include all the strains which belong to the genus Streptomyces and which are able to elaborate Antibiotic T-42082.

The cultivation according to the present invention is carried out by growing any of said strains in a medium containing nutrients which may be utilized by the particular strain. As to medium ingredients, the carbon source may for example be glucose, starch, glycerin, dextrin, sucrose, millet jelly, molasses or/and so forth. As the nitrogen source, there may be utilized meat extract, dried yeast, yeast extract, soybean flour, corn steep liquor, wheat embryos, cotton seed meal, ammonium sulfate, ammonium nitrate and so forth. If necessary, there may be added inorganic salts such as calcium carbonate, sodium chloride, potassium chloride, phosphates, etc. as well as organic and inorganic materials which would assist in the growth of the particular microorganism or in the elaboration of Antibiotic T-42082.

The cultivation may be carried out in generally the same manner as in the production of antibiotics in general, submerged aerobic culture in a fluid medium being particularly desirable. The cultivation is carried out aerobically at an appropriate pH level which is within the range of pH 5 to 9, preferably in the range of pH 6 to 8, and at a temperature in the range of 15° to 40° C, preferably 23 to 34° C, although in many instances the cultivation is preferably carried out in the neighborhood of 28° C. The incubation time normally ranges from 2 to 12 days, preferably 3 to 7 days.

After completion of cultivation, Antibiotic T-42082 is separated and harvested from the broth by conventional procedures which are normally employed for the harvest of microbial metabolites from culture broths, either alone or in a suitable combination. Thus, by taking advantage of its solubility in neutral lipids, the desired antibiotic may be separated by extraction with various organic solvents, phasic transfer, recrystallization, chromatography on various adsorbents and so forth.

The present antibiotic produced by the cultural method thus described hereinbefore occurs in both the liquid phase of the broth and the grown cells. Therefore, the following procedures, for example, may be exploited with advantage. Thus, with the addition of a water-miscible solvent such as methanol, ethanol, acetone or the like, the broth is filtered and, after the solvent has been distilled off from the filtrate, the aqueous solution is adjusted to pH 4-9. The solution is then extracted with a solvent hardly miscible with water, such as ethyl acetate, butyl acetate, chloroform or the like. Then, following removal of the solvent by distillation, the residue is crystallized from a solvent system such as methanol-water, ethanol-water, acetone-water or the like, or with a solvent hardly miscible with water, such as ethyl ether, chloroform or carbon tetrachloride.

Alternatively, the broth is filtered together with a filter aid and the filtrate is extracted with ethyl acetate, chloroform or the like. The cells are also extracted with methanol, ethanol, acetone or the like. The filtrate and cell extract are pooled and, after the solvent has been distilled off, the residue is crystallized from a solvent such as that described. Where the broth is rich in impurities, the broth may be passed through a styrenic adsorbent resin or chromatographed on silica gel, alumina or other carrier material. Then, the eluate free from the contaminants is concentrated under reduced pressure and the residue is crystallized from said solvent.

In the above procedure, crystals of Antibiotic T-42082 can be obtained in good yield. Antibiotic T-42082 may be isolated as crystals of its salts, e.g. sodium, potassium, lithium, ammonium and other salts.

The following are the physical and chemical properties of Antibiotic T-42082 and of its sodium salt, which are obtainable according to the procedures set forth hereinafter in Example 1.

I. The free form of Antibiotic T-42082
1. Color and appearance: Colorless needles
2. Melting point: 120°-122° C
3. Elemental analysis: Found 1 C, 62.73; H, 9.23; O, 26.01; 2 C, 62.74; H, 9.36; O, 27.03(%)
4. Molecular weight: 859 (by osmometry)
5. Ultraviolet absorption spectrum: No characteristic absorptions
6. Infrared absorption spectrum: The spectrum (KBr) is given in FIG. 1. The dominant absorptions (wave-numbers) are as follows: 2940, 1700, 1462, 1383, 1085, 972 $cm^{-1}$
7. Thin-layer chromatography: silica gel, ascending method, detected as a brown spot by a spray of 10% aqueous $H_2SO_4$. The Rf values are given in Table 3.

Table 3

| Solvent system | Rf Free form | Rf Sodium salt |
|---|---|---|
| Ethyl acetate-benzene (1:1) | 0.52 | 0.51 |
| Ethyl acetate | 0.73 | 0.73 |
| Benzene-acetone (9:1) | 0.18 | 0.18 |
| Benzene-acetone (1:1) | 0.88 | 0.89 |
| Chloroform-methanol (19:1) | 0.87 | 0.87 |
| Chloroform-ethyl acetate (2:3) | 0.62 | 0.62 |
| Plate: silica gel plate (Kieselgel 60, Merck, Germany) | | |

Table 4

| Color reagent | Free form | Sodium salt |
| --- | --- | --- |
| Sulfuric acid | Positive (brown) | Positive (brown) |
| Aniline-phthalic acid | Positive (indigo blue) | Positive (indigo blue) |
| Vanillin-sulfuric acid | Positive (violet) | Positive (violet) |
| Molisch | Negative | Negative |
| Dragendorff | Positive (light orange) | Positive (light orange) |
| Barton | Negative | Negative |
| Molybdenic acid | Negative | Negative |
| Benzidine | Negative | Negative |
| Ninhydrin | Negative | Negative |
| Alkaline potassium permanganate | Negative | Negative |

9. Solubilities:

Soluble in methanol, ethanol, acetone, ethyl acetate, ethyl ether, chloroform, benzene and carbon tetrachloride; sparingly soluble in cyclohexane; and very hardly soluble in water and petroleum ether.

II The sodium salt of Antibiotic T-42082

1. Color and appearance: Colorless needles
2. Melting point: 180°–182° C (with brownish discoloration)
3. Elemental analysis: Found 1 C, 62.05; H, 8.99; Na, 2.08; 2 C, 62.27; H, 9.01; Na, 2.79(%)
4. Molecular weight: 871, 878(by osmometry)
5. Optical rotation $[\alpha]_D^{25}$ —4.5±0.5° (in chloroform, c=1.0)
6. Ultraviolet absorption spectrum: No characteristic absorption at and over 210mμ.
7. Infrared absorption spectrum: The spectrum(KBr) is given in FIG. 2. The dominant absorptions (wave-numbers) are as follows: 2935, 1610, 1461, 1382, 1080, 972 cm$^{-1}$
8. NMR: The nuclear magnetic resonance spectrum is reproduced in FIG. 3 which attests to the presence of 3 methoxy groups.
9. Thin-layer chromatography: Refer to Table 3.
10. Color reactions: Refer to Table 4.
11. Solubilities:

Soluble in methanol, ethanol, acetone, ethyl acetate, ethyl ether, chloroform, benzene and carbon tetrachloride; sparingly soluble in cyclohexane; and very hardly soluble in water and petroleum ether.

The biological characteristics of Antibiotic T-42082 sodium salt are given in Table 5.

Table 5

| Assay organism | Minimal inhibitory concentration (mcg/ml) |
| --- | --- |
| Bacillus subtilis PCI 219 | 0.31 |
| Bacillus subtilis ATCC 6633 | 0.31 |
| Bacillus cereus IFO 3466 | <0.1 |
| Bacillus megaterium IFO 12108 | 0.2 – 0.31 |
| Bacillus pumilus IFO 3813 | 0.2 |
| Staphylococcus aureus 209P | 0.2 |
| Escherichia coli IFO 3044 | >100 |
| Proteus vulgaris IFO 3045 | >100 |
| Pseudomonas aeruginosa IFO 3080 | >100 |
| Mycobacterium sp. ATCC 607 | 10 |
| Mycobacterium smegmatis IFO 3083 | 0.4 |
| Candida albicans IFO 0583 | 10 |
| Aspergillus niger IFO 4066 | >50 |
| Penicillium chrysogenum IFO 4626 | >50 |
| Piricularia oryzae P-18 | 10 |

The acute oral toxicity [LD$_{50}$] of Antibiotic T-42082 sodium salt in mice is about 2000 mg/kg, with the LD$_{50}$ value in mice by the intraperitoneal route being 125°–250 mg/kg.

The above physical and chemical properties suggest that Antibiotic T-42082 is a polyether antibiotic compound containing three methoxy groups.

When the physical and chemical properties of Antibiotic T-42082 are compared with those of known polyether antibiotics, it is found that Antibiotic X-537A [The Journal of American Chemical Society 73, 5295 (1951)], Salinomycin (Japanese patent application laid open No. 25392/1972), Antibiotic K-178[Zeitschrift fur Allgemeine Mikrobiologie 4 236(1964), Allgemeine Mikrobiologie 4, 269(1964)], Dianemycin [The Journal of Antibiotics 22, 161(1969)], Antibiotic A-130A (Japanese patent publication No. 4558/1973), etc. have characteristic ultraviolet absorption spectra, whereas Antibiotic T-42082 has no such characteristic absorption spectrum. Antibiotic X-206 [Chemical Communications (1971), 927] has no methoxy group. Monensin [The Journal of American Chemical Society 89, 5737(1967)], Nigericin [Biochemical and Biophysical Research Communications 33, 29(1968)] and Grisorixin [Chemical Communications, 1421(1970)] contain one methoxy group each. Antibiotic A-28695 A(Japanese patent application laid open No. 68795/1973) and Antibiotic A-218(Japanese patent application laid open No. 80793/1973) each have four methoxy groups, and Antibiotic A-204A [The Journal of American Chemical Society 95, 3399(1973)] and Antibiotic K-41 (Japanese patent application laid open No. 14692/1974) contain five methoxy groups. Therefore, the aforementioned antibiotics are clearly distinct from Antibiotic T-42082 which has three methoxy groups. As an antibiotic having three methoxy groups like Antibiotic T-42082, there may be mentioned Antibiotic A-28695 B(Japanese patent application laid open No. 68795/1973) but in view of their differences in melting point, optical rotation, infrared absorption spectrum and other properties, these antibiotics are considered to be dissimilar substances.

Based on the above findings, Antibiotic T-42082 according to the present invention is considered to be a novel compound.

Figure 1:
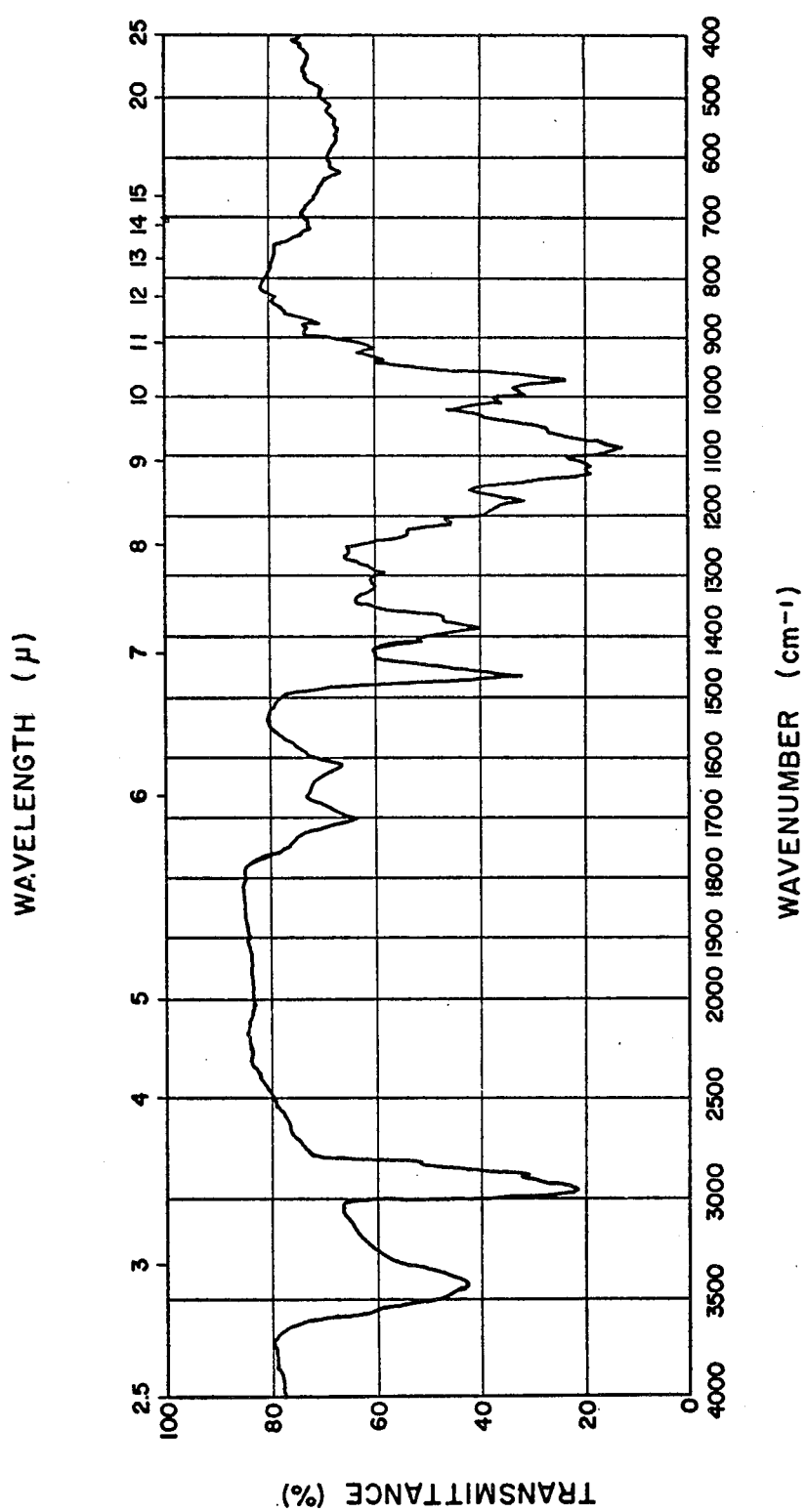
FIG. 1 is an infrared absorption spectrum (KBr) of the free form of Antibiotic T-42082.
Figure 2:
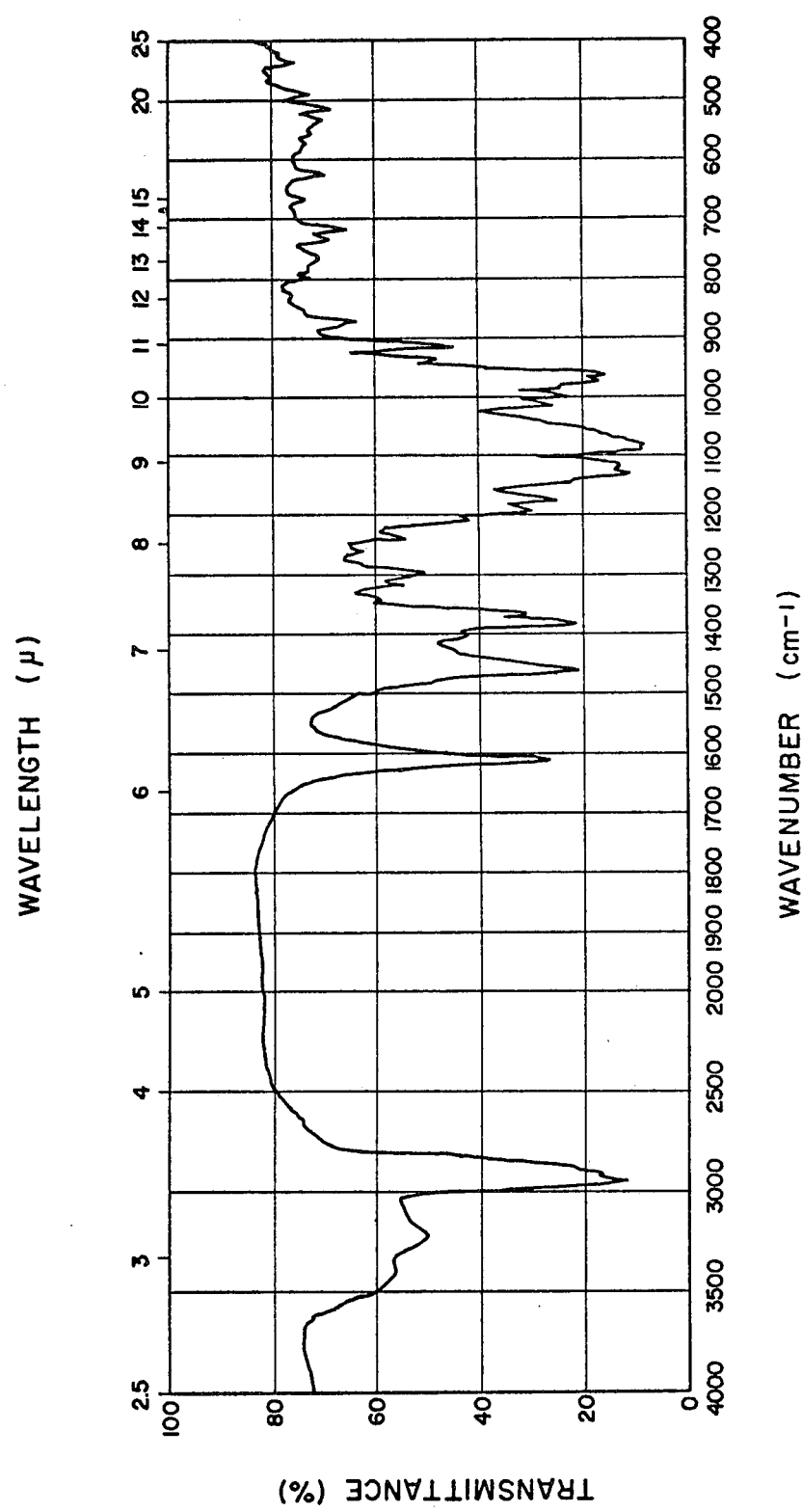
FIG. 2 is an infrared absorption spectrum (KBr) of Antibiotic T-42082 sodium salt.
Figure 3:
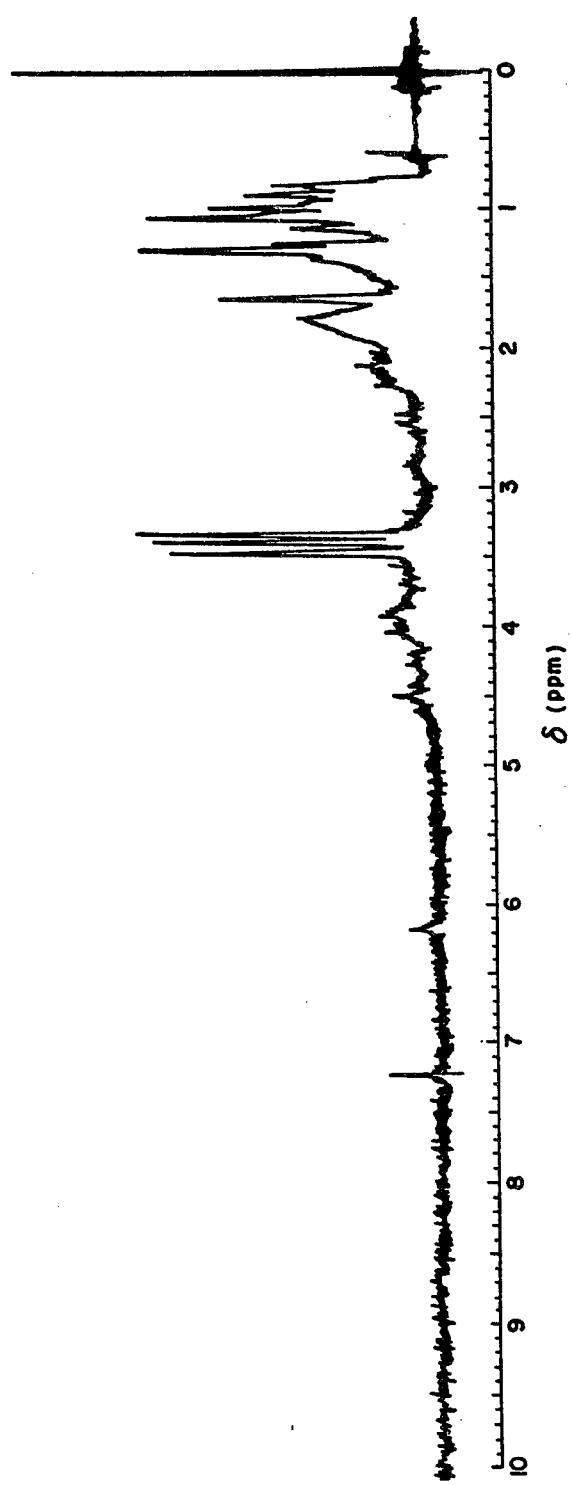
FIG. 3 is a nuclear magnetic resonance spectrum of Antibiotic T-42082 sodium salt.

As described hereinbefore, Antibiotic T-42082 according to the present invention inhibits growth of gram-positive bacteria, acid-fast bacteria and certain fungi.

Therefore, the present antibiotic is of value in the treatment of infections with such microorganisms. For example, it can be utilized as a cream or ointment for topical application containing 0.3 to 1.0% of the same in the prevention or treatment of fester of a wound caused by Staphylococcus aureus. For the purpose of the prevention or treatment of intestine infection by Staphylococcus aureus, it can also be administered as tablets, capsules, etc. at a normal dose level of 20 to 200 mg/kg daily or as injections at a daily dose of 1 to 20 mg/kg per adult human. Since the present antibiotic inhibits growth of *Piricularia oryzae*, it may also be employed as an agricultural aid.

In addition, Antibiotic T-42082 is useful for the prevention and treatment of coccidiosis.

Coccidiosis is an infectious disease caused by parasitic protozoa in domesticated fowls and animals, manifestations of which include diarrhea and nutritional disturbances. poultry, ducks, turkeys, quails, rabbits, goats, sheep and cattle, for instance, often succumb to the disease and sustain serious damages.

Various drugs have been employed for the prevention or treatment of coccidiosis, but they have such drawbacks as inadequate potency, serious side effects or/and liability for the emergence of drug-resistance protozoas.

Antibiotic T-42082, of this invention, has been found to display positive effects in the prevention and treatment of coccidiosis, overcoming the drawbacks of the anticoccidial drugs thus far available.

The anticoccidial drug is produced by processing Antibiotic T-42082, in the absence or presence of a solid or liquid diluent, into powders, dusts granules, tablets, liquids, capsules and so on, or by adding to feed, drinking water or the like with or without previous dispersion in a diluent. The said diluent may be any diluent which per se is physiologically harmless, although it is preferably a substance, that by itself, may be a feedstuff or a feed ingredient.

As a solid diluent, there may be mentioned barley flour, wheat flour, rye flour, corn flour, soybean flour, soybean cake, rapeseed cake, wheat bran, rice bran, extracted rice bran, sweet potato flour, potato flour, soybean curd residue, starch, lactose, sucrose, glucose, fructose, yeast, spent yeast, fish meal, talc, acid clay, clay and so forth. As examples of said liquid diluent, there may be mentioned water, physiological saline, organic solvents which are physiologically harmless and so forth.

In addition to said diluent, there may also be compounded appropriate auxiliary agents such as an emulsifier, dispersing agent, suspending agent, wetting agent, thickener, gelling agent, solubilizer and so forth in appropriate proportions. The resultant composition may be further supplemented with a preservative, fungicide, antibiotic, enzyme preparation, lactobacillus preparation and so forth. Moreover, pyrimethamine, sulfa drugs, vitamin preparations, etc. may be further incorporated.

The proper dosage of the anticoccidial drug varies with the species and breed of domesticated fowl or animal, its age, the route of dosing, symptoms and other factors. For the prevention of coccidiosis in poultry, for example, the present drug is desirably given in such amounts that the poultry will receive about 4.0 to 12.5 mg/kg/day of Antibiotic T-42082. For the treatment of the same disease, the poultry preferably takes about 10 to 30 mg of the antibiotic per kg body weight daily. To achieve this dose level, the drug may be added to the feed in such a proportion that the concentration of Antibiotic T-42082 will be somewhere between about 50 and 300 ppm.

The toxicity of Antibiotic T-42082 in animals is low. For example, the acute toxicity of Antibiotic T-42082 sodium salt in mice ($LD_{50}$) is about 2000 mg/kg by the oral route, or 125 to 250 mg/kg by the intraperitoneal route. The oral toxicity ($LD_{50}$) in poultry is 1100 mg (423–2860 mg)/kg.

An outstanding characteristic of the anticoccidial drug according to this invention is that it is by far safer than any known anticoccidial drug of the polyether type.

The experimental data shown are in the Experimental Description which follows Example 1 are illustrative of the superior effectiveness of the anticoccidial drug.

DESCRIPTION OF THE PREFERRED EMBODIMENT

EXAMPLE 1

A culture medium prepared by adding 0.5 % of precipitated calcium carbonate to an aqueous solution (pH 7.0) containing 2% of glucose, 3% of soluble starch, 1% of raw soybean flour, 1% of corn steep liquor, 0.5% of peptone and 0.3% of sodium chloride was inoculated with *Streptomyces hygroscopicus* T-42082(FERM P 2691, IFO 13609, ATCC 31080). The inoculated medium was incubated under shaking at 28° C for 48 hours. One liter of the resultant culture fluid was transferred to a 100-liter tank containing 30 liters of a culture medium prepared by adding 0.5% of precipitated calcium carbonate to an aqueous solution (pH 7.0) containing 5% of dextrin, 3% of raw soybean flour and 0.1% of peptone and aerobic stirred culture was carried out at 28° C with sparging at the rate of 30 liters/min. for 140 hours.

To the resultant broth was added an equal volume of acetone and after 30 minutes' stirring, the cells were separated from the broth. The cells were resuspended in acetone, the volume of which was equal to that of the broth, and following 30 minutes stirring, the filtrate was separated and pooled with the filtrate previously obtained. The filtrate was concentrated under reduced pressure until the acetone was distilled off and, then, extracted with ethyl acetate, followed by drying over anhydrous sodium sulfate. The ethyl acetate solution was then passed through a column of 400 ml activated carbon, which was washed with ethyl acetate. The active fractions were pooled and the solvent was distilled off. The oily residue was dissolved in benzene and the solution was passed through a column of 500 ml silica gel. Elution was carried out with benzene, benzene-ethyl acetate (9:1), benzene-ethyl acetate (8:2), benzene-ethyl acetate (1:1) and ethyl acetate in the order mentioned. The active fractions were pooled and the solvent was distilled off, whereupon 12.5 g crude powders of Antibiotic T-42082 were obtained. The powders were dissolved in 80% acetone water and, after being adjusted to pH 9.0 with 1N-sodium hydroxide, the solution was concentrated under reduced pressure to remove the acetone. By the above procedure were obtained crystals of Antibiotic T-42082 sodium salt. The crystals were collected and recrystallized from acetone water. By this procedure were obtained 4 g colorless needles of Antibiotic T-42082 sodium salt. The recrystallization mother fluid was adjusted to pH 5.0 with 1N-hydrochloric acid and concentrated under reduced pressure to remove the acetone. The resultant crude crystals were collected and recrystallized from acetone water. The procedure described above provided 2.5 g colorless needles of free Antibiotic T-42082.

EXPERIMENTAL

The basal diet composition used in the following experiment is a nutritionally balanced feed and it is known that chicks show quite good growth on it. By way of example, the chicks grown on this diet in a breeding battery at room temperature, 26°±1° C. (40° C. within the battery) on an ad libitum basis for both feed and drinking water will have body weights in excess of 90 grams on the 9th day after hatching. The test of anticoccidial effect was performed with 3 or 5 healthy chicks having even body weights in a stainless steel cage at 26° ±1° C, under 24 hour lighting, with free access to feed and water and under conditions precluding microbial infections.

The term "healthy control" as used hereinafter means "uninfected, untreated control". All parts are by weight.

EXPERIMENTAL 1

From the caecal contents of a chick, fresh oocysts were collected on the 8th day after infection with *Eimeria tenella*. After sporulation, the oocysts were artificially threshed by the method of Doran and Vettering (Journal of Protozoology 14, 657–662(1967)) to obtain the sporozoides. On the other hand, using Eagle MEM[-Gibco, U.S.A.], BK cells were allowed to multiply well on a glass slip sealed in a Rayton tube. Then, $3\times10^4/0.31$ of the sporozoides previously prepared, 0.2 ml of a test sample (Antibiotic T-42082 as dissolved in methanol to a concentration of 1 mg/ml and, then, diluted 10-fold with the medium to $10^{-5}$ mcg/ml) and 1.5 ml of medium were injected. Cultivation was carried out at 41° C for 3 days. The sporozoides which had entered the BK cells and the grown and multiplied schizonts were stained and counted under a microscope. The results are shown in Table No. 1.

Table No. 1

| Level of addition of sample, mcg/ml (−log) | Grown schizonts | |
|---|---|---|
| | 1 | 2 |
| 0 | × | × |
| 1 | − | − |
| 2 | − | − |
| 3 | − | ± |
| 4 | ++-+++ | ++-+++ |
| 5 | +++ | +++ |
| Inoculated control | +++ | +++ |
| Untreated control | − | − |

EXPERIMENTAL 2

Test materials and testing procedure:

1. Test chicks: White Leghorn, male, 10 days old at the start of the experiment.
2. Coccidium: *Eimeria tenella*; The inoculum size per bird: $5\times10^4$ sporulated oocysts/0.2–0.5 ml.
3. Test compound: Antibiotic T-42082
4. Levels of addition of the test drug: The test compound was added to portions of a compound mash for newly hatched chicks, Feed KP-1-A(composition hereinafter in Example 1), which contained no anticoccidial agent, at the varying levels of 30, 60, 90 and 120 ppm.
5. Testing procedure: The test chicks were bred in quarters protected against coccidial infections and after it had been confirmed that they had no other disease, either, but were healthy, each chick was weighed. They were classed into groups of three birds in such a manner that the body weight distributions of the groups would be substantially identical. Two of the groups were used as "infected control" and "healthy control", respectively.

After the grouping, each test group of chicks were placed on the diet containing the test drug, while the "infected control" and "healthy control" birds were kept on the drugfree diet.

After 24 hours, excepting the birds in the healthy control group, all the birds were orally inoculated with *Eimeria tenella* at a rate of $5\times10^4$ sporulated oocysts per bird.

6. Scoring scheme: Till the end of the test period, each chick was weighed every morning before feeding and, at the same time, the drops of blood (haemorrhage) in its droppings were counted. The chicks were also investigated for deaths. Eight days following the oocyst inoculation, all the test chicks were autopsied and the apparent pathological changes of the caeca and the caecal contents were microscopically examined to evaluate the effectiveness of the drug.

7. Notes to the description in the table.
   a. Relative weight gain $$\frac{\text{Percent weight gain for test group}}{\text{Percent weight gain for healthy control group}} \times 100$$

b. Pathological change of the caecum:

The Test Procedures for Coccidiosis in Poultry (See Kiyoshi Tsunoda and Toshio Ishii. The Research Society of Poultry Diseases (1971), p. 20)

The results of post-mortem examinations were scored according to the following scheme.

(−): The caecum is completely normal.

(+): The caecum retains its normal shape. The contents are slightly fluid, with a tinge of yellow. The mucous membrane of the caecum is slightly swollen and whitish.

(++): The caecum is substantially normal in shape. The entire mucous membrane is swollen. No haemorrhage is noted in the contents. The viscous fluid shows a yellowish discoloration. Within the mucous membrane, a few white dot-like necrotic lesions and blood patches are in evidence.

(+++): The atrophy and deformation of the caecum are obvious. The caecum extends slightly longer than the rectum. The contents include nothing normal and, in many cases, the caecum is full of blood clots or grayish white cheesy denaturation products. The caecal wall is considerably thickened and brittle, sometimes left with dot-like patches of blood. The lesion extends to the base of the caecum but not to the rectum.

(++++): The atrophy and deformation of the caecum are pronounced. Generally the caecum looks like a sausage, as long as the rectum or shorter. The lesion extends to about one-third or one-quater of the rectum. Other findings are similar to those described in (3).

In the above evaluation, where one side of the caecum had been affected more seriously than the other side, the findings on the more seriously affected side were recorded.

Table No. 2

| Test material | Experiment | ppm | No. of blood drops/no. of surviving chicks (average per bird) | | | | No. of deaths | | | | At end of experiment/ At start of Experiment (No. of birds) | The pathological change of the caecum on the 8th day | | | | | Relative weight gain (%) |
|---|---|---|---|---|---|---|---|---|---|---|---|---|---|---|---|---|---|
| | | | 4 | 5 | 6 | 7 days | 5 | 6 | 7 | 8 days | | ++++ | +++ | ++ | + | − | |
| Antibiotic T-42082 | I | 120 | 0 | 0 | 0 | 0 | 0 | 0 | 0 | 0 | 5/5 | | | | | 5 | 94.0 |
| | | 120 | 0 | 0 | 0 | 0 | 0 | 0 | 0 | 0 | 3/3 | | | 3 | 2 | | 105.7 |
| | II | 90 | 0 | 0 | 0 | 0 | 0 | 0 | 0 | 0 | 3/3 | 1 | 1 | 3 | | | 100.4 |
| | | 60 | 0 | 0.6 | 0 | 0 | 0 | 0 | 0 | 0 | 3/3 | 2 | 2 | 1 | | | 101.1 |
| Infected control | | 1 | 4.0 | 13.3 | 9.0 | 3.0 | 0 | 0 | 1 | 0 | 2/3 | 2 | | | | | 21.2 |
| Infected control | | 2 | 2.6 | 9.0 | 9.3 | 5.0 | 0 | 0 | 0 | 1 | 2/3 | 2 | | | | | 44.1 |
| Infected control | | 3 | 2.3 | 9.6 | 11.0 | 3.0 | 2 | 0 | 0 | 0 | 1/3 | 1 | | | | | 69.0 |
| Healthy control | | 1 | 0 | 0 | 0 | 0 | 0 | 0 | 0 | 0 | 3/3 | | | | | 3 | 103.3 |
| Healthy control | | 2 | 0 | 0 | 0 | 0 | 0 | 0 | 0 | 0 | 3/3 | | | | | 3 | 96.7 |
| Healthy control | | 3 | 0 | 0 | 0 | 0 | 0 | 0 | 0 | 0 | 3/3 | | | | | 3 | 99.1 |

Note:
Relative weight ratio = the percentage with the average increased body weight of 78.3 g for the healthy control being taken as 100.

EXPERIMENTAL 3

Heretofore, clopidol, amplolium, decoquinate, etc. have been employed as anticoccidial drugs and, more recently, lobenidine has been introduced. However, continued administration of the same anticoccidial drug induced the emergence of drug-resistant strains. The following experiment was carried out with a wild strain resistant to the conventional anticoccidial drugs.

The oocysts, predominantly of *Eimeria tenella*, obtained from a wild strain were used to inoculate chicks at a rate of $10 \times 10^5$ sporulated oocysts per bird. Other tests materials are the same as those used in Experimental 2. The battery test procedure was repeated.

nor thickening, it sometimes contains an orange-colored viscous fluid.

++: A number of red small patches of blood appear on the mucous membrane of the small intestine. It is also full of orange-colored viscous fluid. The swelling of the small intestine is slight, the intestinal wall being slightly thickened.

+++: The intestinal wall is swollen and thickened. The surface of the mucous membrane become loose and the intestine is full of blood clots and viscous fluids.

++++: The small intestine is swollen all over and contains a great many blood clots. Moreover, owing to the digestion of red blood cells, the small intestine Table No. 3

| Test Material | Concentration (ppm) | No. of blood drops/per bird | | | | No. of deaths | | | | At end of experiment At start of experiment (No. of birds) | The pathological change of the caecum | | | | | Relative Weight gain (%) |
|---|---|---|---|---|---|---|---|---|---|---|---|---|---|---|---|---|
| | | 4 | 5 | 6 | 7 | 5 | 6 | 7 | 8 | | ++++ | +++ | ++ | + | − | |
| T-42082 | 120 | 0 | 0 | 0 | 0 | 0 | 0 | 0 | 0 | 3/3 | 0 | 0 | 1 | 2 | 0 | 98.0 |
| | 62.5 | 0 | 1.0 | 0.6 | 1.0 | 0 | 0 | 0 | 0 | 3/3 | 1 | 1 | 1 | 0 | 0 | 94.1 |
| Lobenidine | 66.0 | 0.6 | 8.0 | 10.0 | 4.6 | 0 | 0 | 0 | 0 | 3/3 | 3 | 0 | 0 | 0 | 0 | 53.4 |
| | 33.0 | 2.3 | 9.3 | 9.3 | 6.0 | 0 | 0 | 0 | 0 | 3/3 | 3 | 0 | 0 | 0 | 0 | 26.4 |
| Uninfected control | 0 | 0 | 0 | 0 | 0 | 0 | 0 | 0 | 0 | 3/3 | 0 | 0 | 0 | 0 | 3 | 102.4 |
| | 0 | 0 | 0 | 0 | 0 | 0 | 0 | 0 | 0 | 3/3 | 0 | 0 | 0 | 0 | 3 | 99.2 |
| | 0 | 0 | 0 | 0 | 0 | 0 | 0 | 0 | 0 | 3/3 | 0 | 0 | 0 | 1 | 2 | 98.3 |
| Infected control | 0 | 3.3 | 10.0 | 8.0 | 4.3 | 0 | 0 | 0 | 0 | 3/3 | 3 | 0 | 0 | 0 | 0 | 64.5 |
| | 0 | 3.6 | 10.0 | 10.0 | 4.5 | 1 | 0 | 0 | 0 | 2/3 | 2 | 0 | 0 | 0 | 0 | 30.0 |

EXPERIMENTAL 4

The same test materials and testing procedure as those described in Experimental 2 were employed. Notes to the description in the table:

a. Average lesion index (degree)

The testing procedure used for coccidiosis in poultry was in conformity with the method of J. Johnson and W. M. Reid [Experimental Parasitology 28, 33(1970)].

The results of post-mortem examinations performed on the 6th and 7th day following the infection were recorded according to the following scheme.

−: The small intestine was completely normal (no pathological change at all).

+: Red small dots of blood appeared on the serous membrane in the middle of the small intestine. Though the small intestine shows neither swelling assumes a peculiar shade and gives off a rank odor. The intestinal wall is exceedingly swollen. Dead chicks are included in this category.

b. OPG: Oocysts per gram of feces The mark "−" in the OPG column means that the value is less than log 3 (not measurable).

Table No. 4

| Infective oocysts ($10 \times 10^4$/bird) | Test material: Antibiotic T-42082 (ppm) | Relative weight gain | Average pathological index (degree) | OPG (log) | | |
|---|---|---|---|---|---|---|
| | | | | 4 | 5 | 6 | 7 days |
| *Eimeria acervulina* | 125 | 108.3 | − | − | − | − | − |
| | 62.5 | 98.4 | ++ | − | 5.2 | 5.4 | |
| | 0 | 90.2 | ++++ | 6.6 | 6.0 | 6.4 | |
| *Eimeria maxima* | 125 | 97.4 | + | | 4.8 | 4.2 | |
| | 62.5 | 94.9 | + | | 5.0 | 5.5 | |
| | 0 | 78.8 | ++ | | 5.2 | 5.0 | |

EXPERIMENTAL 5

The test materials, testing procedure, and scheme of evaluation are similar to those used in Experimental 2 and 4.

Table No. 5

| Infective oocysts ($10\times10^4$/bird) | Test material: Antibiotic T-42082 (ppm) | Realative weight gain | Average pathological index (degree) | OPG (log) 4 | 5 | 6 days |
|---|---|---|---|---|---|---|
| *Eimeria acervulina* | 120 | 100.3 | — | — | — | — |
|  | 90 | 100.4 | — | — | — | — |
|  | 60 | 92.6 | ++ | 5.1 | 6.0 | 4.4 |
|  | 0 | 90.2 | ++++ | 6.5 | 6.9 | 6.6 |

EXAMPLE 1

Ten parts of Antibiotic T-42082, previously milled to sizes not exceeding 149 $\mu$, was mixed with 90 parts of dry extracted soybean flour to prepare a 10% powder of Antibiotic T-42082. $1.0\times10^3$ parts of this powder was compounded with $1.0\times10^6$ parts of Feed KP-1-A (composition hereinafter) (for young broilers) to obtain an avian anticoccidial diet for broilers [The concentration of Antibiotic T-42082: 100 ppm].

| Formula of KP-1-A (for young broilers) | |
|---|---|
| Ingredient | Compounding ratio, weight % |
| Yellow corn | 55.0 |
| Wheat bran | 5.0 |
| Soybean cake | 18.0 |
| Fish meal | 8.0 |
| Fish soluble | 3.0 |
| Alfalfa meal | 3.0 |
| Tallow complex | 5.7 |
| Calcium carbonate | 0.9 |
| Tribasic calcium phosphate | 0.7 |
| Sodium chloride | 0.25 |
| A-Food E beads * | 0.05 |
| B-Feed S * | 0.1 |
| Neo-Mine feed C* | 0.05 |
| Vitamin $B_{12}$ - T * | 0.05 |
| Mixture of active agent and extracted soybean flour | 0.2 |
| Total | 100.0 |

* Trade names [Distributor: Takeda Chemical Industries, Ltd. (Japan)]

EXAMPLE 2

25 parts of Antibiotic T-42082, previously milled to sizes not exceeding 149 $\mu$ in diameter, was blended well with 75 parts of dry extracted soybean flour to prepare a powder containing 25% of Antibiotic T-42082. $4.0\times10^2$ parts of this powder was compounded with $1.0\times10^6$ parts of Feed KP-1-A to obtain an anticoccidial diet for poultry [The concentratin of Antibiotic T-42082: 100 ppm].

EXAMPLE 3

$0.5\times10^3$ parts of the 10% powder obtained in Example 1 was compounded with $1.0\times10^6$ parts of Feed KP-1-A to prepare an anticoccidial diet for poultry [The concentration of Antibiotic T-42082: 50 ppm]

EXAMPLE 4

10 parts of Antibiotic T-42082, previously milled to sizes not exceeding 149 $\mu$, was blended with 2 parts of hydroxypropyl-cellulose and 88 parts of lactose. The mixture was kneaded with 20 parts of water and granulated in a beater-granulator. The wet granules thus obtained were dried at 35° C overnight, whereby 10% granules 150 to 1,000 $\mu$ in diameter are obtained. $1.0\times10^3$ parts of this granular product was compounded with $1.0\times10^6$ parts of Feed KP-1-B (composition hereinafer)(for grown broilers) to prepare an anticoccidial diet for broilers [The concentration of Antibiotic T-42082: 100 ppm].

| Formula of KP-1-B (for grown broilers) | |
|---|---|
| Ingredient | Compounding ratio, wt.% |
| Yellow corn | 58.0 |
| Wheat bran | 5.0 |
| Soybean cake | 14.0 |
| Fish meal | 6.8 |
| Fish soluble | 3.0 |
| Alfalfa meal | 3.0 |
| Tallow complex | 8.0 |
| Calcium carbonate | 0.9 |
| Tribasic calcium phosphate | 0.68 |
| Sodium chloride | 0.25 |
| A-Feed E beads | 0.05 |
| B-Feed S | 0.1 |
| Mixture of active agent with lactose, etc. | 0.1 |
|  | 0.12 |
| Total | 100.0 |

EXAMPLE 5

25 parts of Antibiotic T-42082, previously milled to sizes not exceeding 149 $\mu$, were blended with 2 parts of hydroxypropyl-cellulose and 88 parts of lactose. The mixture was kneaded with 20 parts of water and granulated in a beater-granulator. The resultant wet granules were dried at 55° C overnight to obtain 25% dry granules 150 to 1,000 $\mu$ in diameter. $0.4\times10^3$ parts of the granules were compounded with $1.0\times10^6$ parts of Feed KP-1-B to prepare an anticoccidial diet for poultry [The concentration of Antibiotic T-42082 : 100 ppm].

EXAMPLE 6

$2.0\times10^3$ parts of the 10% granules obtained in Example 4 were combined with $1.0\times10^6$ parts of Feed KP-1-B to prepare an anticoccidial diet for poultry [The concentration of Antibiotic T-42082: 200 ppm].

EXAMPLE 7

$1.2\times10^3$ parts of the 25% granules obtained in Example 5 were compounded with $1.0\times10^6$ parts of Feed KP-1-B to prepare an anticoccidial diet for poultry [The concentration of Antibiotic T-42082: 300 ppm].

By a procedure similar to that described in Example 4, the 10% granules obtained in Example 4 were compounded with feed in various ratios to prepare diets containing Antibiotic T-42082 in various concentrations.

| Amount of the 10% granules obtained in Ex. 4 (parts) | Amount of Feed KP-1-B (parts) | Concentration of Antibiotic T-42082 (ppm) |
|---|---|---|
| $0.6\times10^3$ | $1.0\times10^6$ | 60 |
| $0.9\times10^3$ | $1.0\times10^6$ | 90 |
| $1.2\times10^3$ | $1.0\times10^6$ | 120 |
| $1.8\times10^3$ | $1.0\times10^6$ | 180 |
| $2.4\times10^3$ | $1.0\times10^6$ | 240 |

What we claim is:

1. Antibiotic T-42082 has the following properties:
   1. Melting point: 120°–122° C;

2. Elemental analysis: Found 1 C, 62.73; H, 9.23; O, 26.01; 2 C, 62.74; H, 9.36; O, 27.03(%)
3. Molecular weight: 859 (by osmometry):
4. Ultraviolet absorption spectrum; No characteristic absorptions;
5. Infrared absorption spectrum: The dominant absorptions (wave-numbers) measured in KBr disc method are as follows: 2940, 1700, 1462, 1383, 1085, 972 cm$^{-1}$;
6. Thin-layer chromatography; silica gel, ascending method, detected as a brown spot by a spray of 10% aqueous $H_2SO_4$;

| Solvent System | Rf |
| --- | --- |
| Ethyl acetate-benzene (1:1) | 0.52 |
| Ethyl acetate | 0.73 |
| Benzene-acetone (9:1) | 0.18 |
| Benzene-acetone (1:1) | 0.88 |
| Chloroform-methanol (19:1) | 0.87 |
| Chloroform-ethyl acetate (2:3) | 0.62 |
| Plate: silica gel plate (kieselgel 60, Merck, Germany) | |

7. Color reactions:

| Color reagent | |
| --- | --- |
| Sulfuric acid | Positive (brown) |
| Aniline-phthalic acid | Positive (indigo blue) |
| Vanillin-sulfuric acid | Positive (violet) |
| Molisch | Negative |
| Dragendorff | Positive (light orange) |
| Barton | Negative |
| Molybdenic acid | Negative |
| Benzidine | Negative |
| Ninhydrine | Negative |
| Alkaline potassium permanganate | Negative |

8. Solubilities: Soluble in methanol, ethanol, acetone, ethyl acetate, ethyl ether, chloroform, benzene and carbon tetrachloride; sparingly soluble in cyclohexane; and very hardly soluble in water and petroleum ether;
and a pharmaceutical acceptable salt thereof.

2. A compound as claimed in claim 1, wherein the salt is sodium salt which has the following properties;
1. Melting point: 180°–182° C (with brownish discoloration)
2. Elemental analysis: Found 1 C, 62.05; H, 8.99; Na, 2.08; 2 C, 62.27; H, 9.01; Na, 2.79(%)

3. Molecular weight: 871, 878(by osmometry)
4. Optical rotation $[\alpha]_D^{25}$ —4.5°°0.5° (in chloroform, c—1.0)
5. Ultraviolet absoprtion spectrum: No characteristic absorption at and over 210 mμ.
6. Infrared absorption spectrum: The dominant absorptions (wave-numbers) measured in KBr disc method are as follows: 2935, 1610, 1461, 1382, 1080, 972 cm$^{-1}$
7. Thin-layer chromatography: silica gel, ascending method, detected as a brown spot by a spray of 10% aqueous $H_2SO_4$;
Rf values as follows:

| Solvent system | Rf |
| --- | --- |
| Ethyl acetate-benzene (1:1) | 0.51 |
| Ethyl acetate | 0.73 |
| Benzene-acetone (9:1) | 0.18 |
| Benzene-acetone (1:1) | 0.89 |
| Chloroform-methanol (19:1) | 0.87 |
| Chloroform-ethyl acetate (2:3) | 0.62 |
| Plate: siliaca gel plate [Kieselgel 60, Merck, Germany] | |

8. Color reactions:

| Color reagent | |
| --- | --- |
| Sulfuric acid | Positive (brown) |
| Aniline-phthalic acid | Positive (indigo blue) |
| Vanillin-sulfuric acid | Positive (violet) |
| Molisch | Negative |
| Dragendorff | Positive (light orange) |
| Barton | Negative |
| Molybdenic acid | Negative |
| Benzidine | Negative |
| Ninhydrine | Negative |
| Alkaline potassium permanganate | Negative |

9. Solubilities: Soluble in methanol, ethanol, acetone, ethyl acetate, ethyl ether, chloroform, benzene and carbon tetrachloride; sparingly soluble in cyclohexane; and very hardly soluble in water and petroleum ether.

3. A method for producing Antibiotic T-42082 which comprises cultivating *Streptomyces hygroscopius* T-42082 (ATCC 31080) in a liquid nutrient medium, aerobically, until substantial antibiotic activity is obtained in the resultant medium and then harvesting the antibiotic from said medium.

* * * * *